United States Patent
Ghosh et al.

(10) Patent No.: US 12,058,261 B2
(45) Date of Patent: Aug. 6, 2024

(54) LOW OVERHEAD SIDE CHANNEL PROTECTION FOR NUMBER THEORETIC TRANSFORM

(71) Applicant: Intel Corporation, Santa Clara, CA (US)

(72) Inventors: Santosh Ghosh, Hillsboro, OR (US); Andrea Basso, London (GB); Dumitru-Daniel Dinu, Chandler, AZ (US); Avinash L. Varna, Chandler, AZ (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 86 days.

(21) Appl. No.: 17/480,360

(22) Filed: Sep. 21, 2021

(65) Prior Publication Data

US 2022/0006630 A1 Jan. 6, 2022

(51) Int. Cl.
*H04L 9/30* (2006.01)
*G06F 17/14* (2006.01)
*H04L 9/08* (2006.01)
*H04L 9/32* (2006.01)

(52) U.S. Cl.
CPC .......... *H04L 9/3093* (2013.01); *H04L 9/0869* (2013.01); *H04L 9/3026* (2013.01); *H04L 9/3247* (2013.01)

(58) Field of Classification Search
CPC ... H04L 9/3093; H04L 9/0869; H04L 9/3026; H04L 9/3247; H04L 9/003; H04L 2209/08; G06F 17/144
See application file for complete search history.

(56) References Cited

U.S. PATENT DOCUMENTS

| | | | |
|---|---|---|---|
| 2018/0294950 A1* | 10/2018 | Khedr | H04L 9/008 |
| 2020/0265167 A1* | 8/2020 | Banerjee | H04L 9/0631 |
| 2021/0073316 A1* | 3/2021 | Ulrich | G06F 5/01 |
| 2022/0255721 A1* | 8/2022 | Ren | G06F 9/5027 |

FOREIGN PATENT DOCUMENTS

| | | |
|---|---|---|
| CN | 115840936 A | 3/2023 |
| EP | 4152681 A1 | 3/2023 |
| IN | 202244047459 | 3/2023 |

OTHER PUBLICATIONS

"On Configurable SCA Countermeasures Against Single Trace Attacks for the NTT" by Ravi et al., published 2020. (Year: 2020).*

(Continued)

*Primary Examiner* — Vu V Tran
(74) *Attorney, Agent, or Firm* — JAFFERY WATSON MENDONSA & HAMILTON LLP (57) ABSTRACT

An apparatus comprises an input register comprising an input polynomial, a processing datapath communicatively coupled to the input register comprising a plurality of compute nodes to perform a number theoretic transform (NTT) algorithm on the input polynomial to generate an output polynomial in NTT format. The plurality of compute nodes comprises at least a first butterfly circuit to perform a series of butterfly calculations on input data and a randomizing circuitry to randomize an order of the series of butterfly calculations.

18 Claims, 5 Drawing Sheets

(56) References Cited

OTHER PUBLICATIONS

CRYSTALS-Dilithium: A Lattice-Based Digital Signature Scheme, by Ducas et al.; published 2018 (Year: 2018).*
Extended European Search Report for EP Application No. 22188584. 1, mailed Feb. 13, 2023, 7 pages.
Ravi Prasanna et al: "On Configurable SCA Countermeasures Against Single Trace Attacks for the NTT", Dec. 22, 2020 (Dec. 22, 2020), 16th European Conference—Computer Vision—ECCV 2020, p. 123 146, XP047574487.
Bai Shi et al: "CRYSTALS—Dilithium Algorithm Specifications and Supporting Documentation (Version 3.1 )", , Feb. 8, 2021 (Feb. 8, 2021), pp. 1-38, XP093020615, Retrieved from the Internet: URL:https://pq-crystals.org/dilithium/data/dilithium-specification-round3-20210208.pdf.

* cited by examiner

LOW OVERHEAD SIDE CHANNEL PROTECTION FOR NUMBER THEORETIC TRANSFORM

BACKGROUND

Subject matter described herein relates generally to the field of computer security and more particularly to signature facilities for post-quantum cryptography.

Dilithium is a digital signature scheme based on the difficulty of lattice problems over module lattices that is secure under chosen message attacks. An adversary who has access to a signing oracle can neither produce a signature of a message having a digital signature the adversary has not yet seen, nor produce a different signature of a message that was signed.

Dilithium relies in part on a polynomial multiplication using a secret polynomial, which raises the potential for side channel attacks to obtain secret information used in the signature scheme. Accordingly, techniques to protect Dilithium operations from side channel snooping attacks may find utility, e.g., in computer-based communication systems and methods.

BRIEF DESCRIPTION OF THE DRAWINGS

The detailed description is described with reference to the accompanying figures.

DETAILED DESCRIPTION

Described herein are exemplary systems and methods to implement low overheard side channel protection for number theoretic transform (NTT) operations. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

Figure 1:
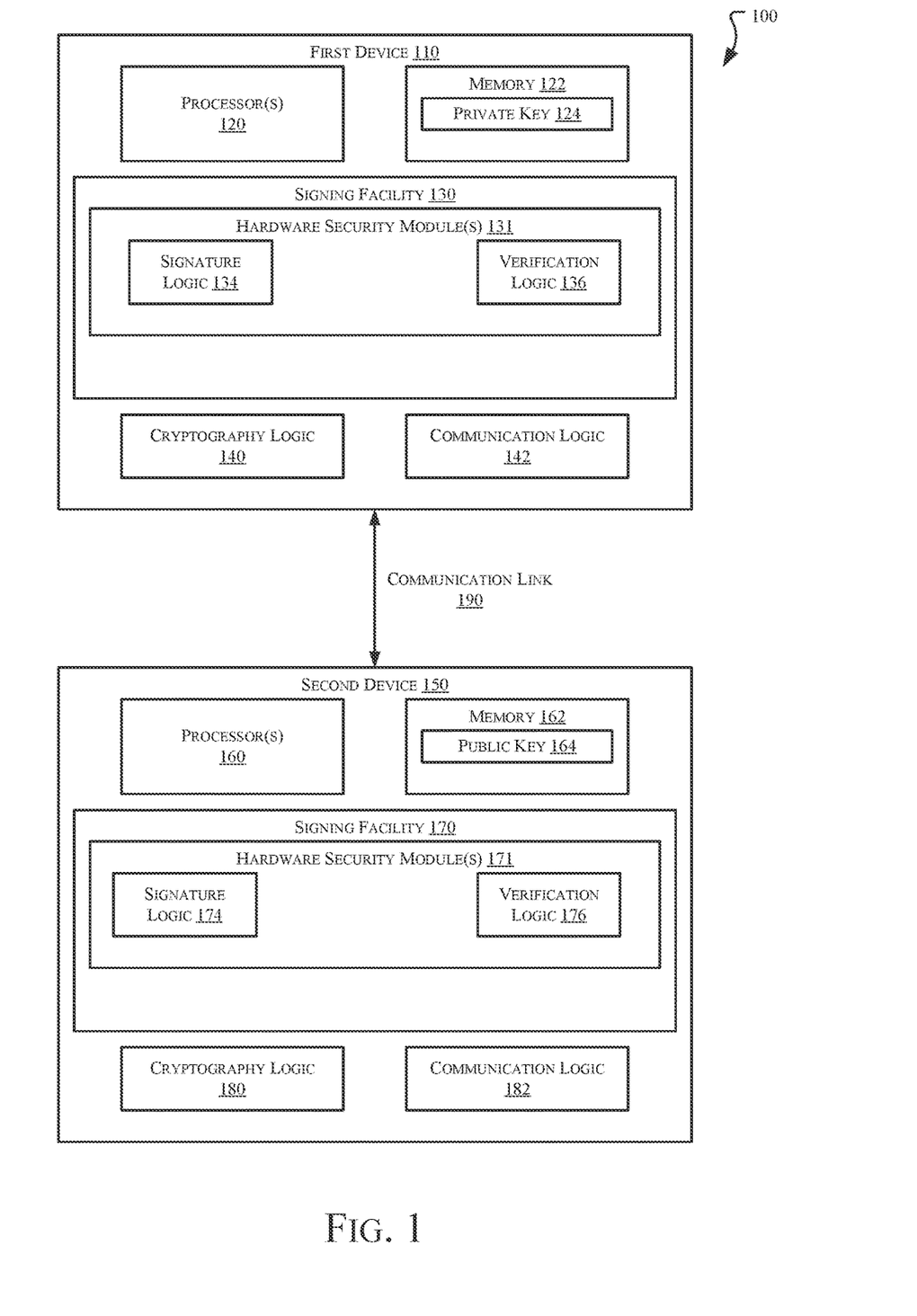
FIG. 1 is a schematic illustration of a signing device and a verifying device, in accordance with embodiments.

FIG. 1 is a schematic illustration of a high-level architecture of a secure environment 100 that includes a first device 110 and a second device 150, in accordance with some examples. Referring to FIG. 1, each of the first device 110 and the second device 150 may be embodied as any type of computing device capable of performing the functions described herein. For example, in some embodiments, each of the first device 110 and the second device 150 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 110 includes one or more processor(s) 120 and a memory 122 to store a private key 124. The processor(s) 120 may be embodied as any type of processor capable of performing the functions described herein. For example, the processor(s) 120 may be embodied as a single or multi-core processor(s), digital signal processor, microcontroller, or other processor or processing/controlling circuit. Similarly, the memory 122 may be embodied as any type of volatile or non-volatile memory or data storage capable of performing the functions described herein. In operation, the memory 122 may store various data and software used during operation of the first device 110 such as operating systems, applications, programs, libraries, and drivers. The memory 122 is communicatively coupled to the processor(s) 120. In some examples the private key 124 may reside in a secure memory that may be part memory 122 or may be separate from memory 122.

First device 110 further comprises a signing facility 130 which comprises one or more hardware security module(s) 131 which includes memory 122, signature logic 134, and verification logic 136. Signature logic 132 may be configured to generate a signature to be transmitted, i.e., a transmitted signature and/or to verify a signature.

Cryptography logic 140 is configured to perform various cryptographic and/or security functions on behalf of the signing device 110. In some embodiments, the cryptography logic 140 may be embodied as a cryptographic engine, an independent security co-processor of the signing device 110, a cryptographic accelerator incorporated into the processor(s) 120, or a standalone software/firmware. In some embodiments, the cryptography logic 140 may generate and/or utilize various cryptographic keys (e.g., symmetric/asymmetric cryptographic keys) to facilitate encryption, decryption, signing, and/or signature verification. Additionally, in some embodiments, the cryptography logic 140 may facilitate to establish a secure connection with remote devices over communication link. It should further be appreciated that, in some embodiments, the cryptography module 140 and/or another module of the first device 110 may establish a trusted execution environment or secure enclave within which a portion of the data described herein may be stored and/or a number of the functions described herein may be performed.

After a signature is generate, the message, M, and signature may then be sent by first device 110, e.g., via communication logic 142, to second device 150 via network communication link 190. In an embodiment, the message, M, may not be encrypted prior to transmission. In another embodiment, the message, M, may be encrypted prior to transmission. For example, the message, M, may be encrypted by cryptography logic 140 to produce an encrypted message.

Second device 150 may also include one or more processors 160 and a memory 162 to store a public key 164. As described above, the processor(s) 160 may be embodied as any type of processor capable of performing the functions described herein. For example, the processor(s) 160 may be embodied as a single or multi-core processor(s), digital signal processor, microcontroller, or other processor or processing/controlling circuit. Similarly, the memory 162 may be embodied as any type of volatile or non-volatile memory or data storage capable of performing the functions described herein. In operation, the memory 162 may store various data and software used during operation of the second device 150 such as operating systems, applications, programs, libraries, and drivers. The memory 162 is communicatively coupled to the processor(s) 160.

Second device 150 further comprises a signing facility 170 comprising one or more hardware security module 171 which includes signature logic 174 and verification logic 176. In instances in which the second device is the verifying device, hardware security module 171 is configured to generate a verification signature based, at least in part, on the signature received from the first device and based, at least in part, on the received message representative (m').

The various modules of the environment 100 may be embodied as hardware, software, firmware, or a combination thereof. For example, the various modules, logic, and other components of the environment 100 may form a portion of, or otherwise be established by, the processor(s) 120 of first device 110 or processor(s) 160 of second device 150, or other hardware components of the devices As such, in some embodiments, one or more of the modules of the environment 100 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. Lattice-based signature algorithms, on the other hand, are expected to withstand attacks by quantum computers. One example of lattice-based signature scheme is the Dilithium signature scheme.

A Dilithium signature process relies on multiple polynomial multiplication operations that utilize a secret polynomial, which raises the opportunity for side-channel snooping attacks to obtain secret information about the operations. Described herein are systems and methods to address these and other issues. In some examples, a signing facility may comprise a processing datapath to implement a number theoretical transform (NTT) operation to transform an input polynomial from its original format to an NTT format, which facilitates processing. The signing facility may further comprise randomizing circuitry to randomize an order of butterfly operations performed in the NTT operations.

More particularly, polynomial multiplication in Dilithium may be computed using the number theoretic transform (NTT) algorithm. The NTT algorithm transforms a polynomial a(x) into its NTT form ã(x). Then, multiplication between polynomials in the NTT form corresponds to coefficient-wise multiplication between polynomials in the NTT form. Thus, it is possible to compute the product between a(x) and b(x) as INTT(NTT(a(x))·NTT(b(x))), where INTT denotes the inverse NTT (i.e. INTT(NTT(a))=a) and x·y denotes the coefficient-wise multiplication between x and y.

A key element of the NTT algorithm is the butterfly operation. This operation receives two coefficients and one constant value and outputs the new values of the coefficients. Implementation of the butterfly operation follows the Cooley-Tukey (CT) algorithm for the forward NTT and Gentleman-Sande (GS) algorithm for the inverse NTT. That is possible because the inverse NTT algorithm is very similar to the forward NTT one, with the main difference being the butterfly operation. The NTT operates on all coefficients of one polynomial multiple times. After eight repetitions (since polynomials in Dilithium have 256 coefficients) of the butterfly operation on all coefficients (with different pairs at each repetition), the NTT result is produced. Thus, the NTT function consists of blocks of 128/n (where n is the number of butterfly units) cycles, where each cycle in a block contains independent operations, i.e. the result of one operation does not depend on the result of any other computation in the same block.

Figure 2:
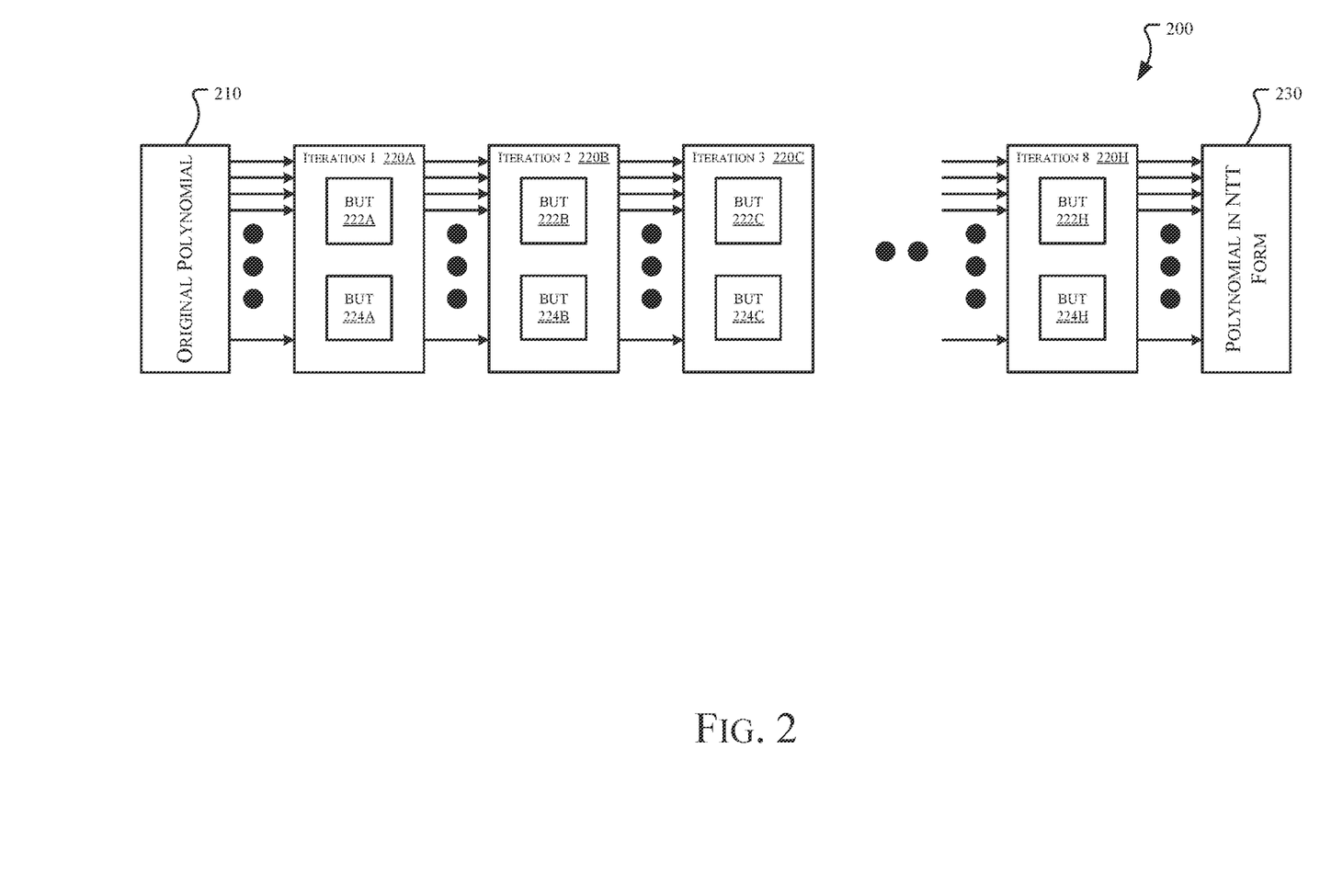
FIG. 2 is a schematic illustration of a processing datapath to implement a number theoretic transform (NTT), in accordance with embodiments.

FIG. 2 is a schematic illustration of a processing datapath 200 to implement a number theoretic transform (NTT), in accordance with embodiments. Referring to FIG. 2, the datapath 200 comprises an input register 210 to receive an original input polynomial. Datapath 200 further comprises a plurality of compute nodes indicated in the drawing by 220A, 220B, 220C, . . . 220H. As described above, in one embodiment the datapath 200 comprises eight compute nodes, which may be referred to collectively by reference numeral 220. Each compute node 220 comprises at least one butterfly circuit to perform a series of butterfly calculations. In one embodiment each compute node comprises a first butterfly circuit 222A, 222B, 222C, . . . 222H and a second butterfly circuit 224A, 224B, 224C, . . . 224H. These butterfly circuits may be referred to collectively herein by reference numerals 222 and 224. Datapath 200 further comprises an output register 230 to receive the polynomial in NTT format.

In some examples the datapath 200 may be protected against side-channel attacks by randomizing operations which can give rise to side-channel leakages. One technique for accomplishing this is referred to as shuffling, which consists of reordering in random order different operations. Several algorithms exist to generate a random shuffle, with the Fisher-Yates algorithm being one of the most secure.

In some examples described herein the order of the 64 computations within each butterfly circuit 222, 224 of the datapath 200 may be randomized. This leads to 64! (approximately $2^{295}$) different configurations, and hence 64! different power/EM traces. This can be achieved by changing the way that the state is updated within a finite-state machine. In order to compute a permutation of 64 elements, we use an inside-out version of the Fisher-Yates algorithm, which requires 64 random numbers in a varying interval between 1 and 64, i.e., 64 random numbers are required, where the i-th number is uniformly random in the interval $\{0, \ldots, i-1\}$.

In some embodiments a shuffle may be implemented directly in hardware, rather than having a shuffle passed by an external party as an input. This gives additional security because an attacker can neither tamper with the process, nor generate a specific shuffle (or disable the shuffling altogether) that can be used to train a machine-learning model to build an attack.

Figure 3A:
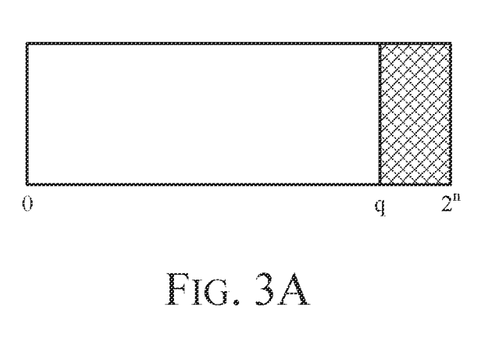
FIG. 3A is a schematic illustration of a rejection sampling algorithm, in accordance with embodiments.

In some embodiments the random numbers may be generated by hashing an input seed. A Keccak-based hashing may be used because the Dilithium algorithm already requires a Keccak core. However, the results are uniformly random in a power-of-two range. This leads to a problem because most numbers between 1 and 64 are not power-of-two and thus we need to find a way to use this randomness to generate random numbers in the correct range. Some implementations may implement rejection-sampling to guarantee the correct range, as illustrated in FIG. 3A. In a rejection sampling technique numbers that do not fall in the correct range are rejected and ignored. Thus, a sampling technique that seeks to generate a random sequence numbers in the range of [0, q] using an algorithm that generates numbers between 0 and $2^n$ simply rejects and ignores results that lie between q and $2^n$.

Figure 3B:
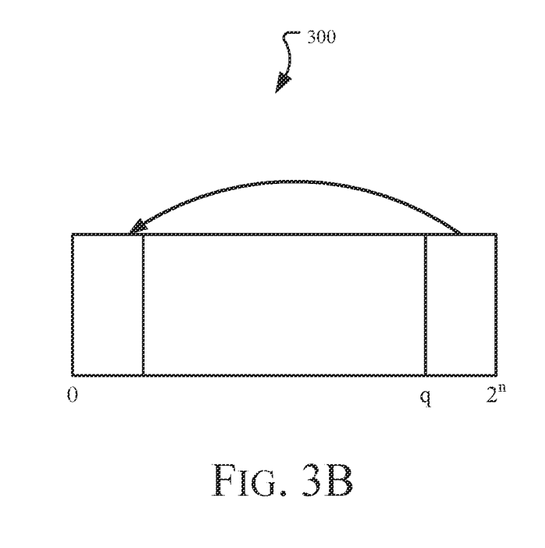
FIG. 3B is a schematic illustration of a modular reduction algorithm, in accordance with embodiments.

As described herein, in some embodiments a modular reduction operation may be used to reduce the range of values to the desired range. This leads to a biased distribution, but analysis shows that the entropy of the randomization is approximately $2^{293}$, i.e., only 3 bits lower than the ideal entropy. This is illustrated in FIG. 3B. Using this approach, a shuffle generation requires fewer random bits, uses a simpler algorithm, and guarantees a constant-time execution. Moreover, computing a random shuffle in hardware leads to higher resistance against sophisticated attacks and greater security.

In some embodiments the same randomization may be used for all eight (8) compute nodes in the butterfly operations of the datapath 200. However, different trade-offs between security and performance can be achieved by using different randomizations for each compute node, or by using the same randomization for multiple NTTs. Other techniques can be applied to further increase the noise, and thus the security, of the implementation. For example, note that two butterfly units are being used in parallel. It is thus possible to randomize which unit operates on which set of data. This only requires 64 bits of randomness, and no modular reduction or rejection sampling is needed since each step only requires one random bit, i.e. a random number in the set {0, 1}. Moreover, several NTTs may be combined in parallel to further increase the noise. It is also possible to use different butterfly operations (one for the forward NTT and one for the inverse NTT) and compute two such operations in parallel. The Dilithium algorithm needs to compute several forward and inverse NTTs, and it is thus well suited for parallelizing such tasks. Similarly, the input seed used by the Fisher-Yates algorithm might be a specific input, or might be derived from other inputs, possibly using domain separation, i.e. appending a constant value to the Keccak input.

Figure 4:
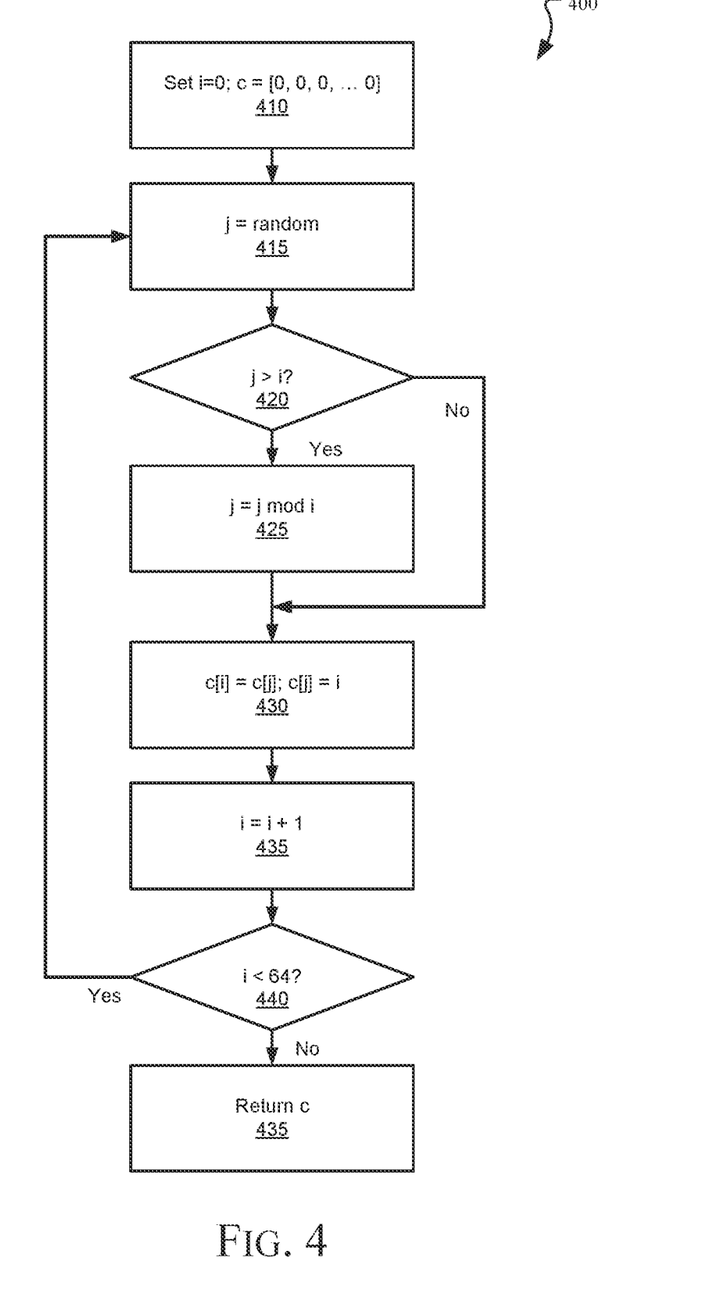
FIG. 4 is a flowchart illustrating operations in a method to implement a modular reduction algorithm, in accordance with embodiments.

FIG. 4 is a flowchart illustrating operations in a method to implement a modular reduction algorithm, in accordance with embodiments. Referring to FIG. 4, at operation 410, a counter variable (i) is initialized to zero and an array (c) of 64 elements is initialized to a series of zeros. At operation 415 a variable (j) is set to a random number. If, at operation 420, the number j is greater than the number i then control passes to operation 425 and the number j is set to j modulo i.

By contrast, if at operation 420 the number j is not greater than the number i then control bypasses operation 425 and passes to operation 430, where the array element c(i) is set to the value of the array element c(j) and the value of array element c(j) is set to i. At operation 435 the counter i is incremented. If, at operation 440, the counter i is less than 64 then control passes back to operation 415 and the variable j is set to a random value again. Thus, operations 415-440 define a loop pursuant to which the values of the array c are filled with 64 unique numbers in random order. By contrast, If, at operation 440, the counter i is less than 64 then control passes to operation 415 and the array (c) of 64 values is returned to be used as the order of operations to be performed by the butterfly circuits 222, 224 in the datapath 200.

In some examples the butterfly operations can be computed using secret sharing techniques. Psuedocode for secret sharing is as follows:

```
def butterfly_CT(a0, a1, w):
    results = cred(a0 + a1 * w, q), cred(a0 - a1 * w, q)
    return results
def butterfly_CT_on_shares(a0, a1, w):
    a1_s1 = random( ) # first share of a1
    a1_s2 = a1 - a1_s1 # second share of a1
    results_s1 = a1_s1 * w # first share of multiplication result
    results_s2 = a1_s2 * w # second share of multiplication result
    results = cred(a0 + results_s1 + results_s2, q), cred(a0 - results_s1 - results_s2, q)
    return results
```

In other examples a blinding operation may be implemented to compute a blinded polynomial. For example, a single random blinding value may be used, which may be implemented with little computational overhead using properties of NTT, with slightly lower side-channel robustness compared to full blinding:

Property 1: NTT is linear, i.e. NTT(x+y)=NTT(x)+NTT(y)

Property 2: NTT([r, r, r . . . , r])=[c0, . . . c0, c1, . . . c1] *r (where c0 and c1 are known constants)

To compute NTT in a blinded manner, a random value r may be added to the input, and the NTT of this blinded polynomial may be computed. At the end of the computation, r*c0 and r*c1 may be subtracted from the first and second halves of the result. The computational overhead is the cost of computing r*c0 and r*c1, which can be done in 1 clock cycle using the two multipliers in the butterfly circuits. The silicon area overhead include control logic to add/subtract these values in the first/last iteration and a few registers to hold these values.

Figure 5:
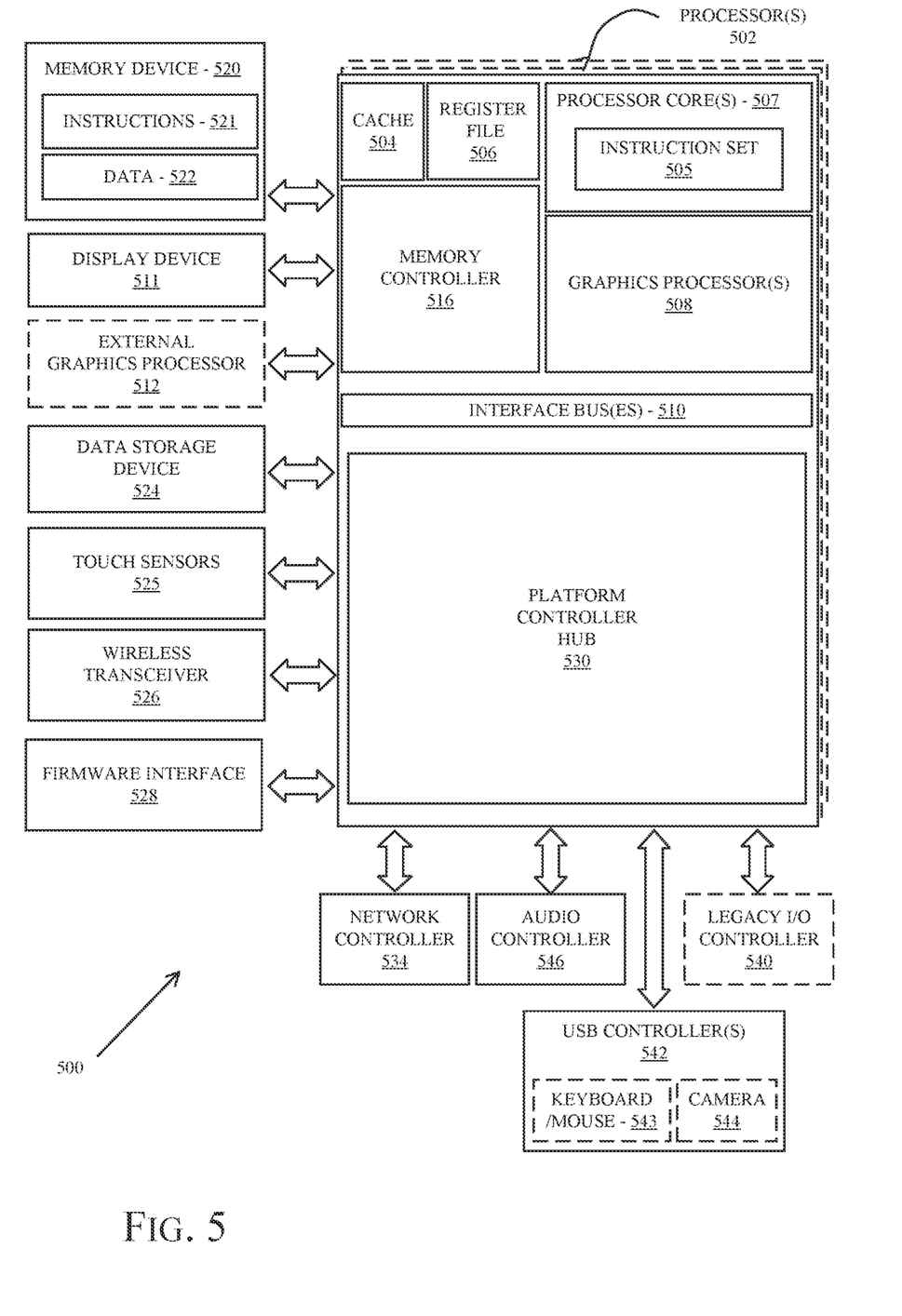
FIG. 5 is a schematic illustration of a computing architecture which may be adapted to implement hardware acceleration in accordance with some examples.

FIG. 5 illustrates an embodiment of an exemplary computing architecture that may be suitable for implementing various embodiments as previously described. In various embodiments, the computing architecture 500 may comprise or be implemented as part of an electronic device. In some embodiments, the computing architecture 500 may be representative, for example of a computer system that implements one or more components of the operating environments described above. In some embodiments, computing architecture 500 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-1 (L1) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, one or more processor(s) 502 are coupled with one or more interface bus(es) 510 to transmit communication signals such as address, data, or control signals between processor 502 and other components in the system. The interface bus 510, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 502 include an integrated memory controller 516 and a platform controller hub 510. The memory controller 516 facilitates communication between a memory device and other components of the system 500, while the platform controller hub (PCH) 510 provides connections to I/O devices via a local I/O bus.

Memory device 520 can be a dynamic random-access memory (DRAM) device, a static random-access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations. In some embodiments a display device 511 can connect to the processor(s) 502. The display device 511 can be one or more of an internal display device, as in a mobile electronic device or a laptop device or an external display device attached via a display interface (e.g., DisplayPort, etc.). In one embodiment the display device 511 can be a head mounted display (HMD) such as a stereoscopic display device for use in virtual reality (VR) applications or augmented reality (AR) applications.

In some embodiments the platform controller hub 510 enables peripherals to connect to memory device 520 and processor 502 via a high-speed I/O bus. The I/O peripherals include, but are not limited to, an audio controller 546, a network controller 514, a firmware interface 528, a wireless transceiver 526, touch sensors 525, a data storage device 524 (e.g., hard disk drive, flash memory, etc.). The data storage device 524 can connect via a storage interface (e.g., SATA) or via a peripheral bus, such as a Peripheral Component Interconnect bus (e.g., PCI, PCI Express). The touch sensors 525 can include touch screen sensors, pressure sensors, or fingerprint sensors. The wireless transceiver 526 can be a Wi-Fi transceiver, a Bluetooth transceiver, or a mobile network transceiver such as a 1G, 4G, or Long Term Evolution (LTE) transceiver. The firmware interface 528 enables communication with system firmware, and can be, for example, a unified extensible firmware interface (UEFI). The network controller 514 can enable a network connection to a wired network. In some embodiments, a high-performance network controller (not shown) couples with the interface bus 510. The audio controller 546, in one embodiment, is a multi-channel high definition audio controller. In one embodiment the system 500 includes an optional legacy I/O controller 540 for coupling legacy (e.g., Personal System 2 (PS/2)) devices to the system. The platform controller hub 510 can also connect to one or more Universal Serial Bus (USB) controllers 542 connect input devices, such as keyboard and mouse 541 combinations, a camera 1244, or other USB input devices.

The following pertains to further examples.

Example 1 is an apparatus, comprising an input register comprising an input polynomial; a processing datapath communicatively coupled to the input register comprising a plurality of compute nodes to perform a number theoretic transform (NTT) algorithm on the input polynomial to generate an output polynomial in NTT format, the plurality of compute nodes comprising at least a first butterfly circuit to perform a series of butterfly calculations on input data; and a randomizing circuitry to randomize an order of the series of butterfly calculations.

In Example 2, the subject matter of Example 1 can optionally include an arrangement wherein the processing datapath comprises eight compute nodes communicatively coupled in series.

In Example 3, the subject matter of any one of Examples 1-2 can optionally include an arrangement wherein plurality of compute nodes comprise a second butterfly circuit which operates in parallel with the first butterfly circuit.

In Example 4, the subject matter of any one of Examples 1-3 can optionally include an output register to receive the output polynomial in NTT format.

In Example 5, the subject matter of any one of Examples 1-4 can optionally include an arrangement wherein the randomizing circuitry implements a modular reduction operation to generate a sequence of operations for the series of butterfly calculations.

In Example 6, the subject matter of any one of Examples 1-5 can optionally include an arrangement wherein the butterfly operations are computed using a secret sharing operation.

In Example 7, the subject matter of any one of Examples 1-6 can optionally include an arrangement wherein the compute node implements a blinded operation to compute a blinded polynomial.

Example 8 is a computer-implemented method, comprising receiving, in an input register, an input polynomial; performing, in a processing datapath communicatively coupled to the input register comprising a plurality of compute nodes, a number theoretic transform (NTT) algorithm on the input polynomial to generate an output polynomial in NTT format, the NTT algorithm comprising performing, in at least a first butterfly circuit, a series of butterfly calculations on input data; and randomizing, in a randomizing circuitry, an order of the series of butterfly calculations.

In Example 9, the subject matter of any one of Example 8 can optionally include an arrangement wherein the processing datapath comprises eight compute nodes communicatively coupled in series.

In Example 10, the subject matter of any one of Examples 8-9 can optionally include an arrangement wherein plurality of compute nodes comprise a second butterfly circuit which operates in parallel with the first butterfly circuit.

In Example 11, the subject matter of any one of Examples 8-10 can optionally include an output register to receive the output polynomial in NTT format.

In Example 12, the subject matter of any one of Examples 8-11 can optionally include an arrangement wherein the randomizing circuitry implements a modular reduction operation to generate a sequence of operations for the series of butterfly calculations.

In Example 13, the subject matter of any one of Examples 8-12 can optionally include an arrangement wherein the butterfly operations are computed using a secret sharing operation.

In Example 14, the subject matter of any one of Examples 8-13 can optionally include an arrangement wherein the compute node implements a blinded operation to compute a blinded polynomial.

Example 15 is an electronic device comprising a processor; an input register comprising an input polynomial; a processing datapath communicatively coupled to the input register comprising a plurality of compute nodes to perform a number theoretic transform (NTT) algorithm on the input polynomial to generate an output polynomial in NTT format, the plurality of compute nodes comprising at least a first butterfly circuit to perform a series of butterfly calculations on input data; and a randomizing circuitry to randomize an order of the series of butterfly calculations.

In Example 16, the subject matter of Example 15 can optionally include an arrangement wherein the processing datapath comprises eight compute nodes communicatively coupled in series.

In Example 17, the subject matter of any one of Examples 15-16 can optionally include an arrangement wherein plurality of compute nodes comprise a second butterfly circuit which operates in parallel with the first butterfly circuit.

In Example 18, the subject matter of any one of Examples 15-17 can optionally include an output register to receive the output polynomial in NTT format.

In Example 19, the subject matter of any one of Examples 15-18 can optionally include an arrangement wherein the randomizing circuitry implements a modular reduction operation to generate a sequence of operations for the series of butterfly calculations.

In Example 20, the subject matter of any one of Examples 15-19 can optionally include an arrangement wherein the butterfly operations are computed using a secret sharing operation.

In Example 21, the subject matter of any one of Examples 15-20 can optionally include an arrangement wherein the compute node implements a blinded operation to compute a blinded polynomial.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    processor circuitry coupled to a memory, the processor circuitry to receive, via an input register, input data perform a number-theoretic transform (NTT) on the input data to generate output data in NTT format, wherein the NTT format output data includes blocks of data; and
    shuffle sequences of data associated with the blocks of data within the NTT format output data such that computations relating to the sequences of data are reordered at predetermined intervals resulting in a constant-time execution of the blocks of data.

2. The apparatus of claim 1, wherein the NTT is performed via a processing datapath associated with the processor and communicatively coupled to an input register, wherein the processing datapath comprises compute nodes communicatively coupled in series.

3. The apparatus of claim 2, wherein the compute nodes comprise butterfly circuits operating in parallel with each other, wherein a butterfly circuit to perform a series of butterfly calculations on the input data.

4. The apparatus of claim 1, further comprising an output register to receive the NTT output format data including an output polynomial in NTT format.

5. The apparatus of claim 1, further comprising randomizing circuitry to randomize an order of the series of butterfly calculations, and implement a modular reduction operation to generate a sequence of operations for the series of butterfly calculations.

6. The apparatus of claim 3, wherein the series of butterfly operations are computed using a secret sharing operation, and wherein a compute node implementing a blinded operation to compute a blinded polynomial.

7. A computer-implemented method, comprising:
receiving, by a processor of a computing device, input data;
performing a number-theoretic transform (NTT) on the input data to generate output data in NTT format, wherein the NTT format output data includes blocks of data; and
shuffling sequences of data associated with the blocks of data within the NTT format output data such that computations relating to the sequences of data are reordered at predetermined intervals resulting in a constant-time execution of the blocks of data.

8. The method of claim 7, wherein the NTT is performed via a processing datapath associated with the processor and communicatively coupled to an input register, wherein the processing datapath comprises compute nodes communicatively coupled in series.

9. The method of claim 8, wherein the compute nodes comprise butterfly circuits operating in parallel with each other, wherein a butterfly circuit to perform a series of butterfly calculations on the input data.

10. The method of claim 7, further comprising receiving, via an output register, the NTT output format data including an output polynomial in NTT format.

11. The method of claim 7, further comprising randomizing, via randomizing circuitry, an order of the series of butterfly calculations, and implementing a modular reduction operation to generate a sequence of operations for the series of butterfly calculations.

12. The method of claim 9, wherein the series of butterfly operations are computed using a secret sharing operation, and wherein a compute node implementing a blinded operation to compute a blinded polynomial.

13. At least one computer-readable medium having stored thereon instructions which, when executed, cause a computing device to perform operations comprising:
receiving input data;
performing a number-theoretic transform (NTT) on the input data to generate output data in NTT format, wherein the NTT format output data includes blocks of data; and
shuffling sequences of data associated with the blocks of data within the NTT format output data such that computations relating to the sequences of data are reordered at predetermined intervals resulting in a constant-time execution of the blocks of data.

14. The computer-readable medium of claim 13, wherein the NTT is performed via a processing datapath associated with the processor and communicatively coupled to an input register, wherein the processing datapath comprises compute nodes communicatively coupled in series.

15. The computer-readable medium of claim 14, wherein the compute nodes comprise butterfly circuits operating in parallel with each other, wherein a butterfly circuit to perform a series of butterfly calculations on the input data.

16. The computer-readable medium of claim 13, further comprising receiving, via an output register, the NTT output format data including an output polynomial in NTT format.

17. The computer-readable medium of claim 13, further comprising randomizing, via randomizing circuitry, an order of the series of butterfly calculations, and implementing a modular reduction operation to generate a sequence of operations for the series of butterfly calculations.

18. The computer-readable medium of claim 15, wherein the series of butterfly operations are computed using a secret sharing operation, and wherein a compute node implementing a blinded operation to compute a blinded polynomial.

* * * * *